J. B. POLLON.
DRAFT EQUALIZER.
APPLICATION FILED JULY 15, 1909.
953,710.
Patented Apr. 5, 1910.
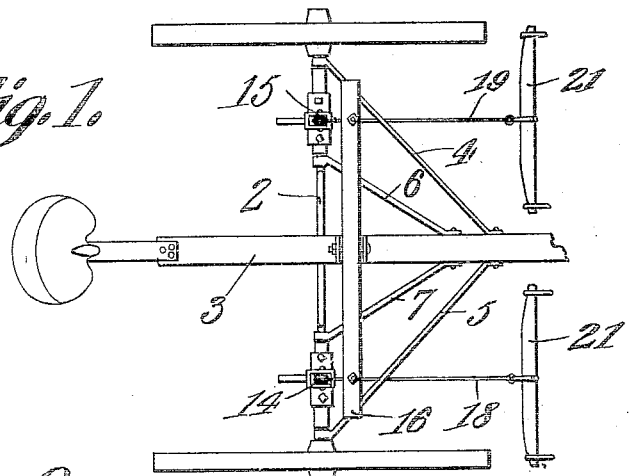
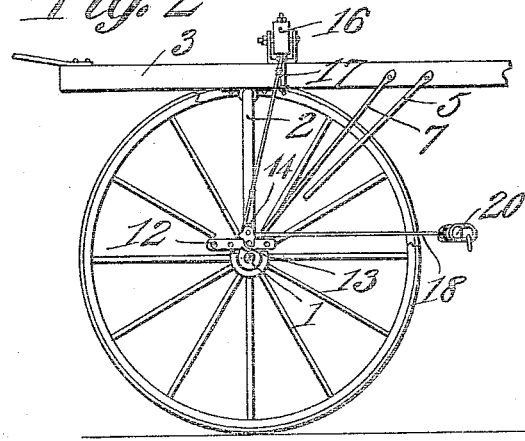
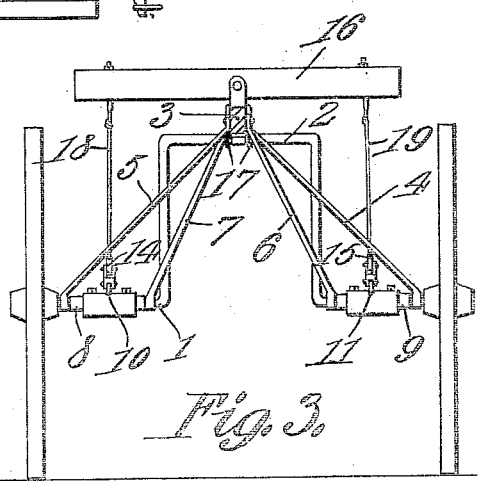
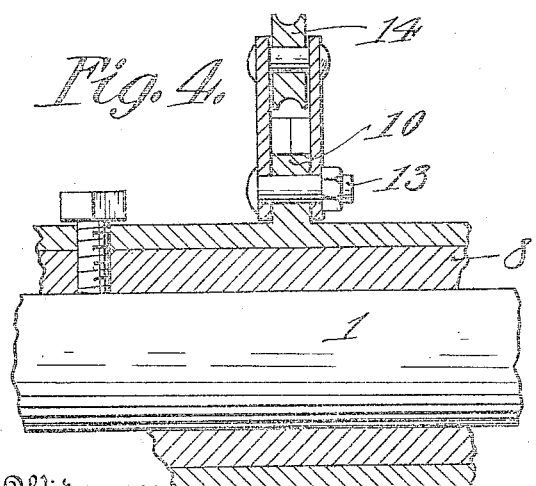
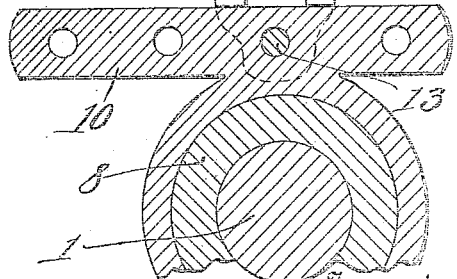
Witnesses
Inventor,
J. B. Pollon
Attorneys

UNITED STATES PATENT OFFICE.

JAMES B. POLLON, OF SOUTH WEST CITY, MISSOURI.

DRAFT-EQUALIZER.

953,710. Specification of Letters Patent. Patented Apr. 5, 1910.

Application filed July 15, 1909. Serial No. 507,781.

*To all whom it may concern:*

Be it known that I, JAMES B. POLLON, a citizen of the United States, residing at South West City, in the county of McDonald and State of Missouri, have invented certain new and useful Improvements in Draft-Equalizers; and I do declare the following to be a full, clear, and exact description of the invention, such as will enable others skilled in the art to which it appertains to make and use the same.

This invention relates to draft equalizers especially adapted for use on cultivators.

The object of the invention is to provide a simply constructed and efficient device of this character which may be readily adjusted to provide for the deep or shallow cultivation by the shovels or to lift them entirely out of the ground when desired.

With this and other objects in view, the invention consists of certain novel features of construction, combination and arrangement of parts as will be more fully described and particularly pointed out in the appended claim.

In the accompanying drawings: Figure 1 is a top plan view of a portion of a cultivator with this improved device applied; Fig. 2 is a side elevation thereof; Fig. 3 is a front elevation thereof; Fig. 4 is a detail transverse section through the clevis and pulleys arranged on one end of the axle. Fig. 5 is a detail sectional view taken at right angles to Fig. 4.

In the embodiment illustrated an axle 1 is shown having the middle part thereof arched as shown at 2 to adapt it to pass over plants without injuring them. A tongue 3 is secured to the arched portion of said axle and connected by brace bars 4 and 5 and 6 and 7 to the straight portions of the axle. Arranged on the axle between the brace bars 4 and 5, 6 and 7 are two spacing sleeves 8 and 9. On these sleeves are mounted clevises 10 and 11 having longitudinally spaced apertures as 12 therein to receive a bolt as 13 for adjustably connecting the pulleys 14 and 15 to the clevises to provide for the adjustment of the plows or shovels (not shown) carried by the cultivator for deep or shallow plowing or to raise said shovels entirely out of the ground when desired as will be more fully explained hereafter. A cross bar 16 is secured to the tongue adjacent the arched portion of the axle by means of clips as 17 or other suitable means. To the outer ends of this cross bar 16 are secured flexible elements 18 and 19 preferably made in the form of chains and which pass downwardly under the pulleys 14 and 15 and to the outer or free ends thereof are secured swingletrees 20 and 21 to which the horses are designed to be hitched. The pulleys 14 and 15 are preferably mounted as shown, in castings having their lower ends bifurcated and extending on opposite sides of the clevises with registering apertures in said bifurcated portions through which the bolt 13 is adapted to pass for securing the pulleys to the clevises at the desired point thereon. By this construction it will be obvious that one horse pulls directly against the other and thereby equalizes the draft.

When it is desired to cause the plows or shovels to cultivate deeply the pulleys are moved toward the front end of the clevises and toward the rear to accomplish the opposite purpose.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

I claim as my invention.

The combination of an arched axle having a tongue secured to the arch thereof, a cross bar mounted on said tongue, clevises mounted on the straight portion of said axle and provided with a plurality of longitudinally spaced apertures, pulleys detachably mounted in one of said apertures, flexible elements secured to opposite ends of said cross bar and passing under said pulleys and swingletrees fastened to the free ends of said flexible elements.

In testimony whereof I have hereunto set my hand in presence of two subscribing witnesses.

JAMES B. POLLON.

Witnesses:
  JOSIE SMITH,
  G. C. MONROE.